(12) United States Patent
Woehler

(10) Patent No.: US 8,050,958 B2
(45) Date of Patent: Nov. 1, 2011

(54) SYSTEMS AND METHODS FOR PLANNING DEMAND FOR CONFIGURABLE PRODUCTS

(75) Inventor: Christian Woehler, Heidelberg (DE)

(73) Assignee: SAP AG, Walldorf (DE)

( * ) Notice: Subject to any disclaimer, the term of this patent is extended or adjusted under 35 U.S.C. 154(b) by 1423 days.

(21) Appl. No.: 11/008,197

(22) Filed: Dec. 10, 2004

(65) Prior Publication Data

US 2005/0159971 A1 Jul. 21, 2005

(30) Foreign Application Priority Data

Dec. 12, 2003 (EP) .................................... 03078947

(51) Int. Cl.
*G06Q 10/00* (2006.01)
(52) U.S. Cl. ....................................................... 705/7.25
(58) Field of Classification Search .................. 705/7.25
See application file for complete search history.

(56) References Cited

U.S. PATENT DOCUMENTS

| | | | | |
|---|---|---|---|---|
| 5,299,115 A | * | 3/1994 | Fields et al. | 705/10 |
| 5,311,424 A | * | 5/1994 | Mukherjee et al. | 705/29 |
| 5,327,340 A | * | 7/1994 | Kaneko et al. | 700/101 |
| 5,675,784 A | * | 10/1997 | Maxwell et al. | 707/100 |
| 5,764,557 A | * | 6/1998 | Hara et al. | 708/603 |
| 5,953,707 A | * | 9/1999 | Huang et al. | 705/7.25 |
| 5,970,476 A | | 10/1999 | Fahey | |
| 5,971,585 A | | 10/1999 | Dangat et al. | |
| 5,974,395 A | * | 10/1999 | Bellini et al. | 705/9 |
| 6,816,839 B1 | * | 11/2004 | Gung et al. | 705/7.31 |
| 6,876,895 B2 | * | 4/2005 | Seimiya et al. | 700/106 |
| 7,039,602 B1 | * | 5/2006 | Kapadia et al. | 705/26 |
| 7,058,587 B1 | | 6/2006 | Horne | |
| 7,260,550 B1 | * | 8/2007 | Notani | 705/10 |
| 7,539,630 B2 | * | 5/2009 | Crampton et al. | 705/26 |

(Continued)

FOREIGN PATENT DOCUMENTS

| | | |
|---|---|---|
| WO | WO 02/37376 A1 | 5/2002 |
| WO | WO 03/040865 A2 | 5/2003 |

OTHER PUBLICATIONS

Mingyuan Chen and Weimin Wang, A linear programming model for integrated steel production and distribution planning, 1997, International Journal of Operations & Production Management, vol. 17n6, pp. 592.*

(Continued)

*Primary Examiner* — Johnna Loftis
*Assistant Examiner* — Brandi P Parker
(74) *Attorney, Agent, or Firm* — Finnegan, Henderson, Farabow, Garrett & Dunner LLP

(57) ABSTRACT

Systems and methods are provided for planning demand of products, such as configurable products. In one embodiment, a method is provided for planning demand for a configurable product in a managed supply chain. In another embodiment, a demand planner is provided for planning demand for a configurable product in a managed supply chain. The method may comprise the steps of: storing master data defining a set of characteristic value combinations relating to the product dependent characteristics of each product; inputting transactional data defining a demand plan with respect to a product or component; specifying at least one product dependent characteristic of one or more products for which an additional characteristic value is to be assigned; automatically generating the additional characteristic value identifying the specified characteristics; and storing the additional characteristic value to the characteristic value combinations in the master data.

25 Claims, 2 Drawing Sheets

U.S. PATENT DOCUMENTS

| | | | |
|---|---|---|---|
| 2002/0099583 A1* | 7/2002 | Matusek et al. | 705/7 |
| 2002/0103686 A1* | 8/2002 | Slocum | 705/8 |
| 2002/0178077 A1 | 11/2002 | Katz et al. | |
| 2005/0038542 A1* | 2/2005 | Kern | 700/105 |
| 2005/0159995 A1 | 7/2005 | Woehler | |

OTHER PUBLICATIONS

Acker, et al., "PROLAP—A Programmatic Approach to Online Analytical Processing," Seattle SAS Users Group International Proceedings, Mar. 30, 2003, pp. 1-3.

Anonymous, "Getting Started With OLAPWork for Microsoft Excel," 1999, Section 1.4.2, pp. 1-25.

Hyperion, "The Role of the OLAP Server in a Data Warehousing Solution," Nov. 30, 1999, pp. 3-18, cover sheet, and end sheet.

Microsoft, "Microsoft SQL Server 2000, T3 Project Technical Overview, White Paper," Feb. 2001, pp. 1-26, cover sheets, and table of contents.

Microstrategy, "The Case for Relational OLAP," 1995, pp. 1-20, cover sheet, and executive summary.

* cited by examiner

US 8,050,958 B2

SYSTEMS AND METHODS FOR PLANNING DEMAND FOR CONFIGURABLE PRODUCTS

BACKGROUND OF THE INVENTION

I. Field of the Invention

The present invention generally relates to computerized planning systems and methods, and to such systems and methods for planning demand for products, such as complex or configurable products having at least one product dependent characteristic and one product independent characteristic. More particularly, the invention relates to planning systems and methods for planning demand for a configurable product in a managed supply chain.

II. Background Information

Demand planning is used to forecast the demand for products. The object of demand planning is to plan the demand of complex or configurable products and their components to obtain values for the product's characteristics. A complex or configurable product is a product having at least one product dependent characteristic, for example, computer memory, configuration, hard disc, etc, and at least one product independent characteristic, for example, sales regions, customer channel and location, etc. In order to plan the demand of complex products and their components, it is desirable that the product independent characteristics can be planned consistently, i.e., adding up the values for all the values of one product independent characteristic gives the same sum for each characteristic. For example, if the total of all sales regions is changed, it is desirable that this change leads to an identical change of the total of all the customer channels, for example.

However, in order to model the bill of material, that is the list of material necessary to make a product, for complex products, the product dependent characteristics, generally, require a modified consistency condition. One such consistency condition is provided, for example, by an enhanced consistency condition. Such an enhanced consistency condition logic allows that the sum of the values for a product dependent characteristic deviates from the sum for the other characteristics so that, for example, the numbers of hard discs can be larger than the number of computers because some computers have more than one hard disc. Nevertheless, there is still a link between the finished product and its components, so that raising the number of computers planned raises the number of hard discs proportionally.

It has been found that conventional demand planning incorporating conventional enhanced consistency logic suffers from one or more drawbacks. One problem is that conventional enhanced consistency logic cannot be used together with the product independent characteristics. A further problem of conventional enhanced consistency logic is that it cannot be used for the demand planning of an aggregate of more than one product. This severely limits the applicability of this logic, because for a large number of products, which is the usual scenario for a manufacturer of complex products, it is not feasible to work on one product at a time, which conventional enhanced consistency condition requires.

These and other problems of conventional approaches compromise the accuracy of the demand planning.

In view of the foregoing, it is an object of the present invention to address these and/or other problems encountered in conventional demand planning incorporating a consistency function.

SUMMARY OF THE INVENTION

Consistent with embodiments of the present invention, computerized systems and methods are disclosed for planning demand for products, such as complex or configurable products. In accordance with one aspect, demand planning is performed while incorporating a consistency function.

According to one embodiment, a method is provided for planning demand for at least one configurable product in a managed supply chain, the at least one product having at least one product dependent characteristic relating to a component of the product, wherein at least one of a plurality of respective component types is associated with each product, respectively. As disclosed herein, the method may comprise the steps of: storing master data defining a set of characteristic value combinations relating to the product dependent characteristics of each product; inputting transactional data defining a demand plan with respect to a product or component; specifying at least one product dependent characteristic of one or more products for which an additional characteristic value is to be assigned; automatically generating the additional characteristic value identifying the specified characteristics; and storing the additional characteristic value to the characteristic value combinations in the master data.

By determining an additional characteristic value in the manner defined, consistency may be achieved for product dependent characteristics together with product independent characteristics. Further, consistency can be achieved for a plurality of products. Moreover, the advantages mentioned above may be achieved without requiring a certain navigation. That is, in contrast to conventional consistency functions, it is not necessary to display all the relevant characteristic values to be able to perform the calculation.

According to a further embodiment of the invention, if a plurality of configurable products defining a product family is planned for, the transactional data may include a first initial value defining the total number of products in the product family, wherein the first initial value is defined by the sum of the number of products to be produced of each product in the product family. Additionally, the method may further include the further steps of: inputting the number of products of each product in the product family to be planned for; and if the modifying step includes modifying at least one of the first initial value and the number of at least one of the products in the product family to be planned for, preserving in the changed demand plan a proportional relationship between the number of each product of the product family to be produced.

In accordance with another embodiment, a demand may be planned for the family of products which are selected. In this embodiment, the method may further include the steps of: loading the data associated with the selected products including the total number of each product to be planned for and respective second value(s); performing the calculation on the product level first without incorporating the additional characteristic value; and subsequently, performing an aggregation calculation incorporating the additional characteristic value.

By first performing a calculation on the product level and then performing an aggregation calculation incorporating the additional characteristic value, an enhanced consistency condition can be used over a large number of products. Thus, a major drawback of conventional enhanced consistency condition logic may be overcome.

According to a yet a further embodiment of the invention, a demand planner is provided for planning demand for at least one configurable product in a managed supply chain, the at least one product having at least one product dependent characteristic relating to a component of the product, wherein at least one of a plurality of respective component types is associated with each product, respectively. As disclosed herein, the demand planner may be operatively associated with a data storage system to store master data defining a set of characteristic value combinations relating to the product dependent characteristics of each product, and may also be operatively associated with a user interface for receiving input of transactional data defining a demand plan with respect to a product or component. Further, a storage medium may be provided having recorded therein processor readable code processable to plan demand for a configurable product in a managed supply chain. The processor readable code may comprise specifying code for specifying at least one product dependent characteristic of one or more products for which an additional characteristic value is to be assigned, automatically generating code for automatically generating the additional characteristic value identifying the specified characteristics, and storing code for storing the additional characteristic value to the characteristic value combinations in the master data.

In accordance with another embodiment of the present invention, a user terminal may be provided comprising means operable to perform one or more steps of any of the methods described above.

In accordance with a further embodiment of the invention, there is provided a program storage device readable by a processing apparatus, the device embodying a program of instructions executable by the processor to perform one or more steps of any of the methods described above.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

Figure 1:
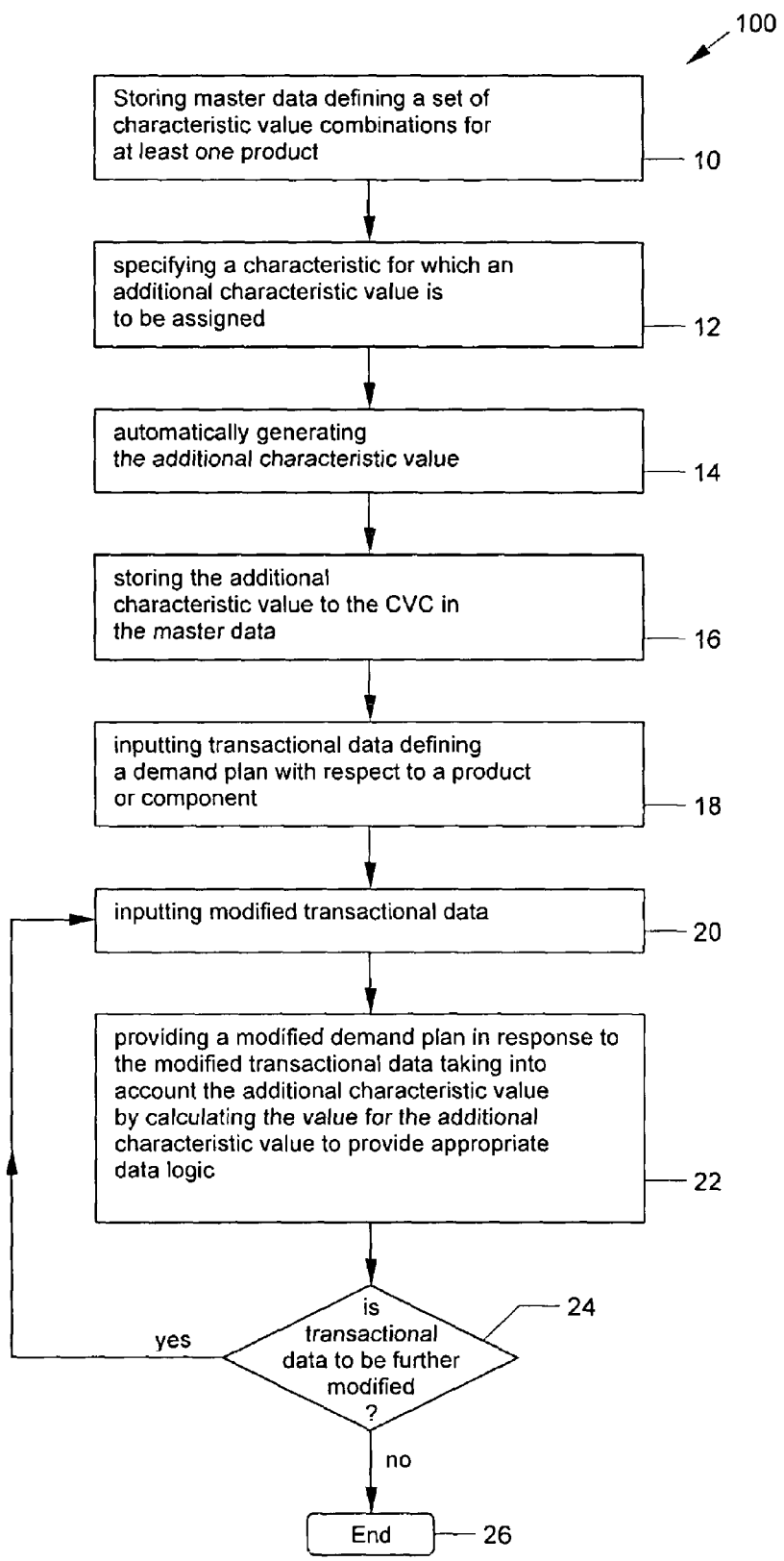
FIG. 1 is a flow chart of an exemplary method for planning demand, in accordance with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Characteristic Based Forecasting (CBF) is a technique used in demand planning. In CBF, a set of characteristics is defined in order to forecast components of assembled products. The set of characteristics is called the CBF characteristics, and may also be referred to as the product dependent characteristics. For example, if the product is a car, the product dependent characteristics of the car may include color and engine size. Products having product dependent characteristics are referred to as configurable products. In demand planning however, other product characteristics are also typically taken into account, such as sales region and customer channels. Such other product characteristics are referred to as product independent characteristics or "free" characteristics.

Using the CBF planning process in the demand planning (DP) component may imply the following structure: free characteristics, for example, location and sales region, are used to describe product independent characteristics; and CBF characteristics defined in the profile for each product individually are used to describe product components, for example, a memory or central processing unit (CPU) of a computer.

For all the characteristics, the consistent calculation is the same: the values of all the details of one characteristic add up to a total which is the same for all the characteristics used. Technically, this consistency is natural for free characteristics. Also, from the business process point of view inconsistency does not make sense for free characteristics.

However, for product dependent characteristics (also referred to as CBF characteristics) it has been found that there are certain planning scenarios which require inconsistent planning, such as in the following: modelling of the bill of material in demand planning in order to derive the required components following from the forecast. Planning configurations of a product, for example one computer model, it is possible that each computer has at least one product dependent characteristic, for example a hard disc, wherein the value of the number of hard discs required to produce one computer is greater than one, and consequently the number of all the hard discs can be larger than the number of computers planned. This is the case of over planning, but similarly, the case of under planning occurs when, for example, a computer is sold without a certain product dependent characteristic, for example, without any hard disc.

In the following description certain expressions are used, which are known to persons skilled in the art of demand planning or supply chain management. Thus, by way of example only and in a non-limiting manner, the following explanation of certain expressions is included.

Aggregation is a function by which key figure values on the lowest level of detail are automatically summed at run time and displayed on a high level. For example, if a forecasted demand is displayed for a region in an interactive planning screen, the forecasted demand for all of the different sales channels, product families, brands, products, and/or customers in that region is shown. This provides a consistent planning approach throughout an organization. Key figure values may be stored at the lowest level of detail. If aggregates are used, the data may also be saved on the aggregate levels.

On the other hand, disaggregation is a function by which a key figure value on a high level is automatically broken down to the detailed level. For example, if demand is forecast in a particular region, the system instantly splits up this number among the different sales channels, product families, brands, products, customers, and so on, in this region. This function, as with aggregation, provides a consistent planning approach throughout an organization. As with aggregation, key figure values may be stored at the lowest level of detail. If aggregates are also used, the data may also be stored on the aggregate levels. With both the aggregation and disaggregation functions, a demand plan can be carried out on the basis of a percentage representation.

A selection may be made by a user and specify some characteristic values or not (in which case all the data is aggregated) and thereby define a set of characteristic value combinations, which may be referred to as "CVC." The number displayed then just represents a number for each time period over which a demand is planned (i.e., a time bucket).

The set of characteristic value combinations may express the characteristics a product or component may have, for example, the product "computer A" may be defined as having a product dependent characteristic, "hard disc" of component type 40 GB. The characteristic value combinations may be stored as master data. Transactional data, on the other hand, is the planning data and will vary depending on the particular demand plan being carried out.

A drill down (also referred to as a Drill down) is a function which represents a more detailed view of the data of the selection which respect to one or more characteristic(s). That is, the data are grouped by the characteristic values.

CVC fall into the group of master data and the planning values stored in a data storage system are transaction data. In CBF, loading selections and saving them is typically the only interaction with the data storage system.

Embodiments of the present invention may allow the consistent treatment of differences between the value of a characteristic. That is, the sum of the details of one characteristic and the total number of products being planned for. The application logic providing this functionality is a component oriented logic and may also referred hereinafter as delta logic, it specifies a top-down planning logic in the interactive demand planning. According to one aspect of the present invention, the component oriented logic is handled in such a way that an additional characteristic value is added to the respective characteristic and this value is a key word for switching on the component oriented logic to achieve the consistency referred to above.

In one embodiment of the present invention, a delta calculation is performed on the displayed details of a product dependent characteristic (CBF characteristic) for one product. In a further embodiment, in order to use the component oriented logic for aggregates of more than one product as well as other drill down situations, further steps embodied in further code may be executed.

It has been found that for keeping the values for each product of an aggregate constant navigation on a CBF characteristic requires that the data are loaded and calculated also on a product level. By way of example, it may be visualized as if a drill down on a CBF characteristic implies the additional drill down on the products. If the value for one CBF characteristic value, CBF-CV, is changed, the change is distributed to the products according to their ratios with which they contribute to the CBF-CV. This means also that products which do not have the CBF-CV in their profile are ignored in the subsequent calculation. After the disaggregation of the change of the data for the CBF-CV on each product, the change is compensated in such a way the sum of each product separately does not change. This is achieved according to an aspect of the present invention, by determining and using an additional characteristic value, hereinafter referred to also as the delta value, to which the difference is added so that both changes together give the same sum. Consequently, the sum of the products is not modified. After this calculation for all the affected products the aggregation calculation with respect to the products has to be done to give again the displayed values.

In order to enable the component oriented logic also when the drill down is done only on one CBF-CV, in a preferred embodiment, code is provided to load in addition, the data of the additional characteristic value, and also to save them together with the other changes.

In a further embodiment, the maintenance of the profiles is adapted so that the component oriented logic can be switched on for each demand plan. Thus, this embodiment allows the optional implementation of the component oriented logic in connection with CBF characteristics. For example, a double click on a planning table creates a PopUp which allows to specify that the additional characteristic value is used and if it is to be displayed in the interactive demand planning. If the additional characteristic value logic is to be used the additional characteristic value is added to the characteristics of the planning table. With adding the additional characteristic value the DBT for the planning table and the profile are updated. This leads to standard behavior then adding a new value to a CBF planning table; in other profiles, the new value is displayed but set as not planning relevant. This setting has to be changed in the other profiles individually. The difference with the additional characteristic value is that its setting cannot be changed directly but only via the interaction with the PopUp.

As can be seen in FIG. 1, an exemplary process 100 in which the additional characteristic value is assigned includes the steps of storing master data defining a set of characteristic value combinations (CVC) for at least one product (step 10). Process 100 also includes the step of specifying a characteristic for which an additional characteristic value is to be assigned (step 12). Optionally, this step may include specifying a plurality of characteristics. Subsequently, the additional characteristic value is automatically generated (step 14) and the value of the additional characteristic value is stored to the CVC in the master data (step 16). Thereafter, transactional data defining a demand plan with respect to a product or component may be provided as input (step 18). The process 100 may also include the additional steps of inputting modified transactional data (step 20) and providing a modified demand plan in response to the modified transactional data taking into account the additional characteristic value by calculating the value for the additional characteristic value to provide appropriate data logic (step 22). Subsequently, it may be determined whether further modified transactional data is to be input (step 24) and, if so, the process returns to step 20 and if not, the process ends (step 26).

In further embodiments of the present invention, further process steps may be carried out as further described herein.

According to an embodiment of the invention, there is provided a method of planning demand for at least one configurable product in a managed supply chain, the at least one product having at least one product dependent characteristic relating to a component of the product, wherein at least one of a plurality of respective component types is associated with each product, respectively. The method may comprise the steps of: storing master data defining a set of characteristic value combinations relating to the product dependent characteristics of the or each product; inputting transactional data defining a demand plan with respect to a product or component; specifying at least one product dependent characteristic of one or more products for which an additional characteristic value is to be assigned; automatically generating the additional characteristic value identifying the specified characteristics; and storing the additional characteristic value to the characteristic value combinations in the master data. In this way, the user can specify the criteria for which a "nonconsistent" approach may be applied.

This may be achieved by the specifying step including the step of determining if the difference between the sum of the second value for each component type, respectively, and the first value for the or each product is non-zero.

In a further embodiment, a further step includes automatically modifying the transactional data to take into account the additional characteristic value if the transactional data relates to a product or component including a specified characteristic. In this way, the proportional relationships between component types are preserved in the demand planning in cases where an additional characteristic value is assigned.

Typically, the transactional data relates to the planning data and may include a first initial value defining the number of products to be planned for or, in addition, additional values relating to characteristics including components and component types or, optionally, products or product families.

A further embodiment of the invention includes the step of automatically disaggregating the first initial value to the characteristics associated with the configurable product, to obtain a second initial value for each of the at least one of a plurality of component types defining the number of each component type required in order to produce the first value of products planned, to define an initial demand plan. In yet a further embodiment, the step of determining a difference between the first initial value and a sum of the second initial value for each component type, respectively, is carried out.

An additional embodiment of the invention includes the further steps of inputting modified transactional data and providing a modified demand plan in response to the modifying step, wherein the providing step includes the step of performing a calculation on the modified transactional data, so that a proportional relationship between a first initial value and an initial second value is preserved in the modified demand plan.

Further, if the first initial value is modified, the performing step may include performing a disaggregation calculation taking into account the value of the additional characteristic value. On the other hand, if at least one of the plurality of second values is changed, the performing step may include performing an aggregation calculation taking into account the value of the additional characteristic value.

The specifying step may include the step of determining if the difference between the total number of products and the sum of each component type required to plan for the total number products is non-zero.

In certain circumstances, rather than planning for a single product, it may be desirable to plan for a plurality of products. For the situation where a user desires to plan demand for a plurality of configurable products defining a product family, the first initial value may define to total number of products in the product family to be planned for. The first initial value may be defined by the sum of the number of products to be produced of each product in the product family. Further, the above-described method may additionally include the steps of inputting the number of products of each product in the product family to be planned for, and if the modifying step includes modifying at least one of the first initial value and the number of at least one of the products in the product family to be planned for, preserving in the changed demand plan a proportional relationship between the number of each product of the product family to be produced.

Additionally, if the transactional data includes data relating to a particular component, or component type, and if the transactional data is modified, the method may further include the step of selecting those products including the component type associated with the modified transactional data. For the selected products, the following steps may also be performed: loading the data associated with the selected products including the total number of each product to be planned for and respective component type value(s); performing a calculation on the product level first without taking into account the additional characteristic value; and, subsequently, performing an aggregation calculation taking into account the additional characteristic value, may be carried out, wherein the data may be loaded to a buffer, and the calculation is performed on the data loaded in the buffer.

A further embodiment of the invention includes the step of determining, if the second initial value is changed, the difference between the changed second value and the second initial value, and adding the difference to the additional characteristic value.

Consistent with yet another embodiment, the method may further include the steps of: inputting the number of products of each product in the product family to be planned for; and if the changing step includes changing at least one of the first initial value and the number of at least one of the products in the product family to be planned for, preserving in the changed demand plan a proportional relationship between the number of each product of the product family to be produced.

For the above-described situation, if a second value is changed, the further step of selecting those products including the component type associated with the changed second value may be carried out. Further, the method may include: loading the data associated with the selected products including the total number of each product to be planned for and respective second value(s); performing the calculation on the product level first without incorporating the additional characteristic value; and, subsequently, performing an aggregation calculation incorporating the additional characteristic value. By performing the calculation first on the product level and the subsequently performing an aggregation calculation, consistency may be achieved for a product family.

Optionally, the data associated with the products selected in the selection step may be loaded to a buffer, wherein the calculation is performed on the data loaded in the buffer.

In the following description, a specific embodiment of the present invention is given. Further, contrasting examples with conventional demand planning applications are given, in order to demonstrate potential advantages of the present invention with respect to a conventional demand planning application, in particular, to demonstrate the function and advantages achieved by the additional characteristic value logic (also referred to as the component oriented logic). In one embodiment, the product to be forecast in the demand planning are computers configurable with two different hard discs: a first hard disc having a 60 GB capacity and a second hard disc having a 90 GB capacity, for the next month. Entering the initial total value of 100 computers to be planned for, and assuming an equal distribution between computers with a first hard disc and a second hard disc results in the disaggregation 100→(50, 50), wherein the 100 represents the total number of products to be planned, the "→" represents the disaggregation calculation, the first "50" is a value representing the number to be planned of the computers having the first hard disc and the second "50" is a value representing the number to be planned of the computers having the second hard disc. Changing the value for the first hard disc model to "80" gives, in a conventional aggregation calculation.

(80, 50)→130, where "→" here represents an aggregation calculation, and "130" gives the total number of products to be planned for based on the sum of the value for the first hard disc (80) and the second hard disc (30). Further, in a conventional application, the new total value of 130 computers is transferred to all the other characteristic combinations, for example, the total of CPUs used in the next month is also changed to 130. In contrast, according to embodiments of the present invention, where an additional characteristic value (delta) is applied, so that when the value of the for the first hard disc model is changed to "80", the aggregation calculation gives: (80, 50)→100, so that the number of computers and other characteristics combinations is not changed but remains 100. Changing the total number of computers to be planned for to 200, according to a conventional disaggregation calculation gives: 200→(123,77), whereas in contrast, changing the total number of computer to be planned for to 200 according to embodiments of the present invention gives: 200→(160, 100). Thus, it is seen that according to the present invention, when the total number is changed the proportion of products to be planned for having a first hard disc with respect to a second hard disc is preserved. This is achieved by the provision of an additional characteristic value which is incorporated into the aggregation and disaggregation calculation. The value taken by the additional characteristic value is determined by the difference between the initial values (i.e., the values prior to any changes being introduced into the demand planning), of the total number of products to be planned for and the sum of the characteristic values of the number of first hard discs and second hard discs. Thus, in the example given, the additional characteristic value is equal to 100−(80+50), i.e. −30.

Entering new values on an aggregate, embodiments of the present invention carry out the disaggregation calculation on all characteristics and their values as usual in a consistent way. However, when data for characteristic values are changed for which characteristic, the additional characteristic value logic has been enabled, the total and the data of the other details are not changed, thus creating, in the conventional sense, an "inconsistent" situation. Nevertheless, although the situation is in principle inconsistent, it is possible to work in a sensible and consistent way. For example, if the total number of products to be planned for is changed, this change is again disaggregated according to the ratios in the details level, that is the level corresponding to the first and second hard discs, in the example given. Thus, according to embodiments of the present invention, if the number of products to be planned is changed, the disaggregated proportion on the characteristic level are preserved in accordance with the initial proportions of one member with respect to another.

In the example given above, there are only two members: a first hard disc and a second hard disc. However, embodiments of the invention are not limited in this respect. For a particular characteristic, there may be several members, for example, the product dependent characteristic CPU may include members: 800 MHz, 1.5 GHz, and 2.6 GHz. In which case, if a change in the total is introduced the proportions with respect to the initial values for 800 MHz, 1.5 GHz, and 2.6 GHz are preserved in the disaggregation calculation. Further, copying values from one key figure to another is possible as well as using disaggregation with respect to another key figure.

Further, consistent with an embodiment of the invention, by specifying only one product in the selection used in the interactive demand planning, the additional characteristic value logic may be implemented using a macro. At least in a drill down to all details of the respective characteristic, the available data are sufficient to execute the required calculation for the additional characteristic value logic.

In addition, however, users may wish to work with not only one product, but, for example, all products of one product group, which is not at present possible with conventional demand planning applications. A further embodiment of the present invention provides a solution to this problem. The additional characteristic value calculation (delta calculation) according to this further embodiment of the present invention may be carried out as follows:

The detail is changed, for example, in a drill down situation on hard disc for an aggregate of three products. The change is distributed to all the three products according to the ratios and then, on each product, the additional characteristic value logic is executed so that the sum does not change for any of the three products separately, that is if the additional characteristic value logic has been activated for this characteristic for all the three products. Finally, the aggregation of the three products is done again in order to display the result. The additional calculation may be involved since the selections are not restricted to certain characteristic value combinations (CVC). In addition, according to a further embodiment of the present invention, it is possible to perform a drill down on free characteristics before the drill down on the CBF characteristic which uses the additional characteristic value logic. Typically, it is necessary that for each characteristic value combination displayed the implicitly selected products are determined and the delta calculation is executed on product level for each product separately.

As mentioned, the user may specify individually for each profile and for each CBF characteristic if the additional characteristic value logic is to be used or not. In the interactive demand planning, the logic will be used accordingly.

A yet further embodiment of the present invention, is now described. For purposes of illustration, assume the following:
product family A includes four products: computer_a, computer_b, computer_c, computer_d, with the characteristic values:
computer_a: hard disc=20 GB, 40 GB, 70 GB (with enhanced consistency logic),
computer_b: hard disc=40 GB, 70 GB, 120 GB (with standard consistency logic) and
computer_c: hard disc=40 GB, 70 GB, 120 GB (with enhanced consistency logic).

For a planning period, for example, Jan. 2004, the following detailed values are maintained:

The value of the total number of computer_as planned is 100.

The values of the components for each hard disc are:
20 GB=20
40 GB=40
70 GB=40, respectively.

The delta value, that is the value of the additional characteristic value is determined as described above to be 0.

Similarly, value of the total number of computer_bs planned is 200.

The values of the components for each hard disc are:
40 GB=80
70 GB=80
120 GB=40, respectively.

And, for computer_c, the value of the total number of computer_cs planned is 100.

The values of the components for each hard disc are:
40 GB=20
70 GB=40
120 GB=40, respectively.

The delta value, that is the value of the additional characteristic value is determined as described above to be 0.

If now the data for e.g. product family A are loaded and a drill down on hard disc is done, the following is displayed:
Total number of products planned in family A=400.
The values of the components for each hard disc for family A is:
20 GB=20
40 GB=140
70 GB=160
120 GB=80, respectively.

Changing now the value for 20 GB from 20 to 40 leads to display:

Total number of products planned in family A=400.

The values of the components for each hard disc for family A is:

20 GB=40
40 GB=140
70 GB=160
120 GB=80, respectively.

Internally the change only affects computer_a because the other computers are not planned with 20 GB hard disc. This information is obtained by reading the master data for all the implicitly selected products, i.e., in this case all products having a 20 GB hard disc. The master data in this particular example being:

Total value of computer_a: 100
hard disc
20 GB=40
40 GB=40
70 GB=40
Delta=−20, respectively.

This is example, is a relatively straight forward. Embodiments of the present invention, however, also cover more complex examples, for example, if the value for 40 GB were changed from 140 to 280, because computers_a, b and c all include a hard disc having a 40 GB hard disc.

For example, if the value for hard disc 40 GB were changed from 140 to 280, the calculation incorporating the additional characteristic value (delta), includes the step of loading the detailed data, also referred to as the master data, for all the implicitly selected products. This is carried out because the correct ratio for distributing the change from the product aggregate to the individual products has to be known; the disaggregation can be done with respect to the product and then the calculation is done for each product individually according to the defined consistency logic; after that the aggregation calculation is done and it results in the following display:

Total number of family A=480.

The values of the components for each hard disc for family A is:

20 GB=40
40 GB=280
70 GB=160
120 GB=80, respectively.

Internally (that is the non-displayed results) the changes calculated are:

The value of the total number of computer_as planned is 100.

The values of the components for each hard disc are:
computer_a:
20 GB=40
40 GB=80
70 GB=40
Delta=−60

The value of the total number of computer_bs planned is 280.

The values of the components for each hard disc are:
40 GB=160
70 GB=80
120 GB=40, respectively.

The value of the total number of computer_cs planned is 100.

The values of the components for each hard disc are:
40 GB=40
70 GB=40
120 GB=40
Delta=−20, respectively.

In an alternative embodiment, the user may specify that the internal calculated changes be displayed.

The determination of an additional characteristic value (delta value) and its use as previously described allows the above calculation to be carried out, in contrast to conventional demand planning applications, which do not include this functionality.

To perform the calculation, in particular, the following steps may be carried out: the internal loading of the product specific data and performing the calculation on the product level first using the standard of enhanced consistency logic and then aggregating the results again for the display.

In order to show the consistency with respect to disaggregation the total number for the computers may be doubled:

Total number of family A=960.

The values of the components for each hard disc for family A is:

20 GB=80
40 GB=560
70 GB=320
120 GB=160, respectively.

Internally (that is the non-displayed results) the changes calculated are:

The value of the total number of computer_as planned is 200.

The values of the components for each hard disc are:
20 GB=80
40 GB=160
70 GB=80
Delta=−120

The value of the total number of computer_bs planned is 560.

The values of the components for each hard disc are:
40 GB=320
70 GB=160
120 GB=80

The value of the total number of computer_cs planned is 200.

The values of the components for each hard disc are:
40 GB=80
70 GB=80
120 GB=80
Delta=−40.

Typically, the transaction data, also referred to in the art as detailed data, is loaded into a buffer from the LiveCache, described with reference to FIG. 2. However, this is not necessary.

Figure 2:
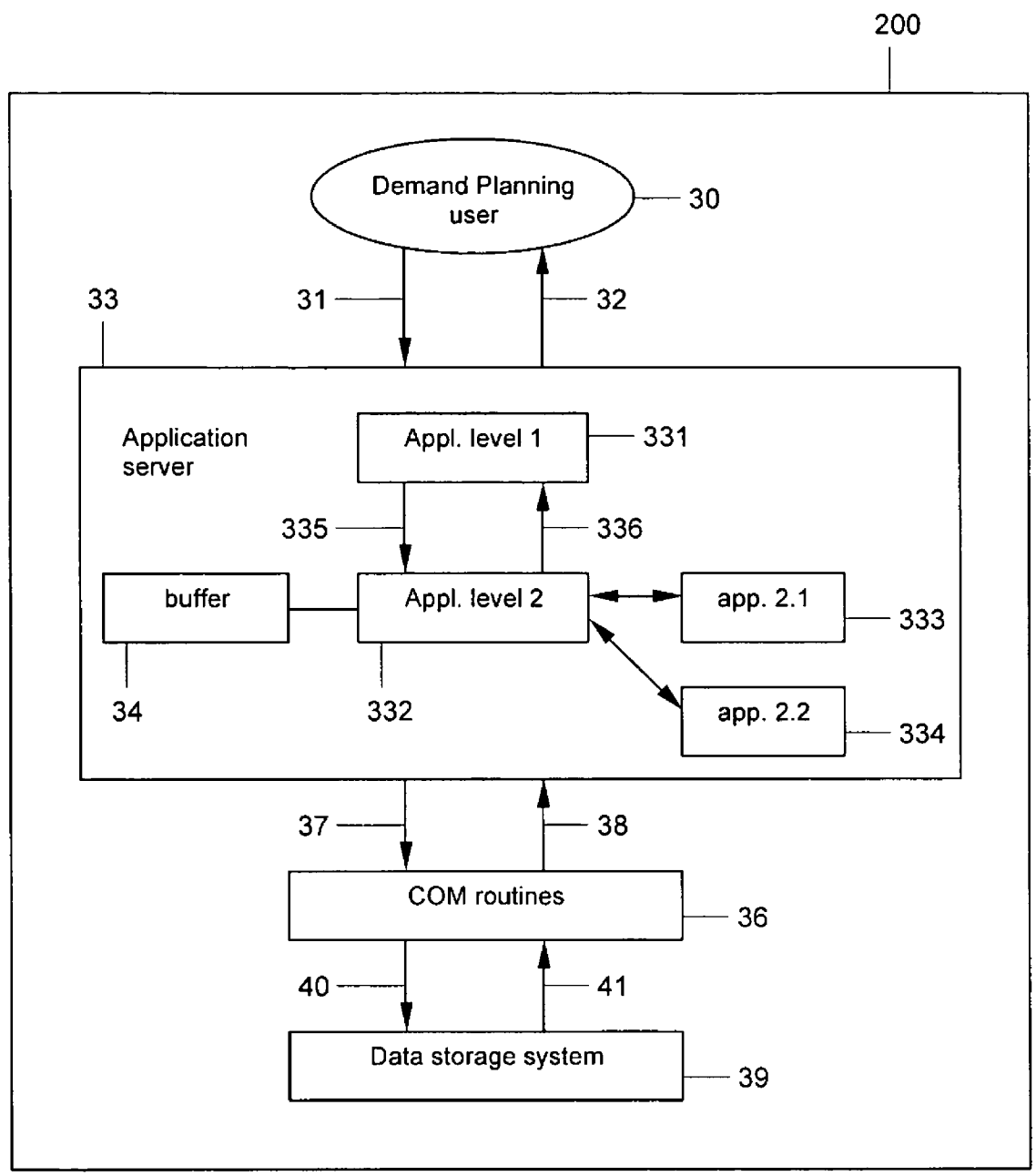
FIG. 2 is a diagram of an exemplary system architecture, in accordance with an embodiment of the present invention.

FIG. 2 shows an exemplary system architecture, consistent with an embodiment of the present invention. In particular, FIG. 2 illustrates a system architecture 200 with which the embodiments described above may be implemented, including the data flow and data processing steps initiated by a demand planning apparatus or method with respect to characteristics-based forecasting.

As illustrated in FIG. 2, the system 200 includes a demand planning user 30 which is a graphic user interface (GUI), with which a user interacts. Typically, the user makes a request or inputs data 31 to an application server 33. In particular, the user inputs a first initial value, at least one second initial value and changed values, if and when desired. Having provided data and/or a request, the user receives an output in the form of a delivery of data 32 from the application server 33. The application server 33 may run the application logic which carries out the demand planning.

The system 200 further typically includes a programming system 36 for running Common Object Model (COM) routines and defining a network programming system. The COM routines receive a request or an input of data 37 from the application server. Furthermore, the COM routines deliver data 38 to the application server 33. The function of the COM routines is to carry out data transformation and data calculation. The COM routines are further in association with a data storage system 39, such as an object oriented database, for example, LiveCache. The COM routines send a request or an input of data 40 to the data storage system. The data storage system 39 delivers data 41 to the COM routines.

Returning to the application server 33 and FIG. 2, in one embodiment of the present invention, a demand planner apparatus may be provided for planning demand for a configurable product in a managed supply chain, the at least one product having at least one product dependent characteristic relating to a component of the product, wherein at least one of a plurality of respective component types is associated with each product, respectively. The demand planner may be operatively associated with a data storage system (such as system 39) to store master data storing master data defining a set of characteristic value combinations relating to the product dependent characteristics of the or each product, and may be operatively associated with a user interface (such as interface 30) for receiving input (such as input 31) of transactional data defining a demand plan with respect to a product or component. Further, a storage medium (see 33, 331, 332, 333, 334 in FIG. 2) may be provided having recorded therein processor readable code processable to plan demand for a configurable product in a managed supply chain, the processor readable code comprising specifying code for specifying at least one product dependent characteristic of one or more products for which an additional characteristic value is to be assigned, automatically generating code for automatically generating the additional characteristic value identifying the specified characteristics, and storing code for storing the additional characteristic value to the characteristic value combinations in the master data.

The application logic may be written in Advanced Business Application Programming (ABAP), a programming language developed by SAP AG (Walldorf, Germany) for application development. However, embodiments of the invention are not limited in this respect and other programming languages are also suitable depending on the particular application embodiments of the present invention are incorporated into.

Referring again to FIG. 2, the application server 33 may include a plurality of application levels 331, 332, 333, 334. The first application level 1 331 is may be adapted to carry out the request processing which is input by the demand planning user 30. At this level, the user request is processed without processing the actual data. Generally, data is not manipulated at the first application level 331. The second application level 332, 333, 334 may be adapted to carry out the data processing. The second application level 2 332 may comprises two sub levels: a second application level 2.1 333 that is adapted to carry out a high level of data processing and a second application level 2.2 334 that is adapted to carry out a low level of data processing. In other words the second application level 2.1 333 may be adapted to carry out more general data processing than the second application level 2.2 334. In one embodiment, the delta calculation is carried out by the more general second application level 2.1 333.

The application server 33 is arranged to carry out CBF. To achieve this, the application logic carries out the functions of performing a CBF data transformation, a CBF data calculation on a higher level by second application level 2.1 and a CBF data calculation at a lower level by second application level 2.2. In order to carry out the data calculations, a buffer 34 may be provided in to which the master data of the implicitly selected products is loaded. In one embodiment, the data to be processed is structured in a table within the buffer 34.

Consistent with embodiments of the invention, data is modeled using internal tables in the buffer. Several entries and more fields are used which model the relationship between owner and members. In particular, with respect to a particular drill down, the buffer table structure may allow owners and members to be identified, so that the desired data is extracted.

It will be understood that depending on the other applications comprised in the system 100, the system may include a plurality of GUIs and/or applications. Further, although only one GUI and application are shown in FIG. 2 other GUIs and/or applications may also be comprised in the system.

In a demand planning application, the internal logic for dealing with characteristic-based forecasting data may incorporate the following: The data are stored in a data storage system 39, for example an object oriented data storage system, such as LiveCache (LC). The data are typically represented with three technical characteristics for profile, table, and row. The presentation of the data for the application uses the CBF characteristics which describe the features of specific products. The calculation required between the internal representation of the CBF data and the application representation of the data are done in a characteristic calculation function group on the application server 33. The CBF calculations in this function group are based on the data of the global internal table. The data read from the data storage system, for example, LiveCache (LC), are stored there together with all the results stored in the buffer 34 together with all the results calculated in order to provide data 50 to the application server 33.

Embodiments of the invention as described herein can be implemented in digital electronic circuitry, or in computer hardware, firmware, software, or in any combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. Embodiments of the invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example, semiconductor memory devices, such as EEPROM, and flash memory devices; magnetic disks such as internal hard disks and removable disks; magneto-optical disks; and CD-ROM disks.

Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While specific embodiments of the invention have been described above, it will be appreciated that the invention may be practiced otherwise than as described. In the embodiments described, certain products, characteristics and other parameters are referred to. The present invention is not limited to these particular products, characteristics or other parameters, and these are given by way of example only. Embodiments of the present invention have broad application to the demand planning of any product, including configurable products. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for planning demand for at least one configurable product in a managed supply chain, comprising:
   storing, using a processor, master data defining a set of characteristic value combinations relating to product-dependent characteristics of a configurable product, wherein the configurable product is associated with a plurality of component types;
   defining, using the processor, an initial demand plan for the configurable product, the initial demand plan comprising a first initial value and a plurality of second initial values, wherein the first initial value defines a planned number of the configurable product, and further wherein the second initial values define planned numbers of the plurality of component types associated with the configurable product;
   calculating, using the processor, an additional characteristic value for one or more of the product dependent characteristics of the configurable product based on the defined initial demand plan; and
   generating, using the processor, a modified demand plan for the configurable product based on the defined initial demand plan and the calculated additional characteristic value, the modified demand plan preserving a proportional relationship between the planned number of the configurable product and a sum of the planned numbers of the plurality of component types of the configurable product, wherein generating the modified demand plan comprises:
      modifying the planned number of the configurable product or at least one of the planned numbers of the plurality of component types of the configurable product according to the calculated additional characteristic value.

2. The method of claim 1, wherein defining comprises disaggregating the first initial value to stored characteristic value combinations related to the plurality of component types of the configurable product to obtain the second initial values for the plurality of component types.

3. The method of claim 2, wherein calculating comprises determining a difference between the first initial value and the sum of the second initial values for the component types.

4. The method of claim 1, further comprising:
   receiving modified transactional data, the modified transactional data modifying at least one of (i) the first initial value and (ii) one or more of the plurality of second initial values,
   wherein generating comprises generating the modified demand plan based on at least the modified transactional data and the additional characteristic value.

5. The method of claim 4, wherein the modified transactional data modifies the first initial value, and wherein generating further comprises disaggregating the modified first initial value to the plurality of second initial values using the additional characteristic value.

6. The method of claim 4, wherein the modified transaction data modifies at least one second initial value, and wherein generating further comprises aggregating the plurality of second initial values using the additional characteristic value.

7. The method of claim 1, wherein defining comprises defining the initial demand plan for a plurality of configurable products of a product family, wherein the first initial value defines a total planned number of configurable products in the product family, and wherein defining further comprises computing the first initial value as a sum of a planned number of products to be produced for the products in the product family.

8. The method of claim 7, further comprising:
   receiving modified transactional data that modifies a planned number of a component type of one or more of the plurality of configurable products of the product family; and
   selecting-one or more configurable products that include the component type associated with the modified transactional data,
   wherein generating comprises generating the modified demand plan for the plurality of configurable products of the product family based on at least the modified transactional data and the additional characteristic value, the modified demand plan preserving a proportional relationship between the number of each product of the product family to be produced.

9. The method of claim 8, further comprising:
   loading the data associated with the selected products, the modified data comprising at least the planned number of the selected product and component type values of the selected products;
   computing a modified planned number for the selected products based on the modified data relating to the component type; and
   aggregating the modified planned number for the selected products using the additional characteristic value to generate a modified planned number of configurable products in the product family.

10. The method of claim 9, further comprising loading data associated with the selected products to a buffer.

11. The method of claim 10, wherein the computing and the aggregating use the data loaded in the buffer.

12. The method of claim 4, wherein the modified transactional data modifies one or more of the plurality of second initial values, and further comprising:
   determining a difference between the second initial value and—the one or more modified second initial values; and
   adding each determined difference to the additional characteristic value.

13. An apparatus for planning demand for at least one configurable product in a managed supply chain, comprising:
a computer-readable storage; and
a processor coupled to the computer-readable storage medium, wherein the computer-readable storage medium stores instructions for controlling the processor, and wherein the processor, being operative with the instructions, is configured to:
store master data defining a set of characteristic value combinations relating to one product-dependent characteristics of a configurable product, wherein the configurable product is associated with a plurality of component types;
identify an initial demand plan for the configurable product, the initial demand plan comprising a first initial value and a plurality of second initial values, wherein the first initial value defines a planned number of the configurable product, and further wherein the second initial values define planned numbers of the plurality of component types associated with the configurable product;
calculate an additional characteristic value of one or more of the product dependent characteristics of the configurable product based on the defined initial demand plan; and
generate a modified demand plan for the at least one configurable product based on the defined initial demand plan and the calculated additional characteristic value, the modified demand plan preserving a proportional relationship between the planned number of the configurable product and a sum of the planned numbers of the plurality of component types of the configurable product,
wherein the processor configured to generate is further configured to:
modify the planned number of the configurable product or at least one of the planned numbers of the plurality of component types of the configurable product according to the calculated additional characteristic value.

14. A computerized system for planning demand for at least one configurable product in a managed supply chain, comprising:
a processor;
a storage device coupled to the processor;
a module configured to store, in the storage device, master data defining a set of characteristic value combinations relating to product-dependent characteristics of a configurable product, wherein the configurable product is associated with a plurality of component types;
a module configured to use the processor to define an initial demand plan for the configurable product, the initial demand plan comprising a first initial value and a plurality of second initial values, wherein the first initial value defines a planned number of the configurable product, and further wherein the second initial values define planned numbers of the plurality of component types associated with the configurable product;
a module configured to use the processor to calculate an additional characteristic value for one or more of the product dependent characteristics of the configurable product based on the defined initial demand plan; and
a module configured to use the processor to generate a modified demand plan for the at least one configurable product based on the defined initial demand plan and the calculated additional characteristic value, the modified demand plan preserving a proportional relationship between the planned number of the configurable product and a sum of the planned numbers of the plurality of component types of the configurable product, wherein the module configured to generate is further configured to use the processor to:
modify the planned number of the configurable product or at least one of the planned numbers of the plurality of component types of the configurable product according to the calculated additional characteristic value.

15. The computerized system of claim 14, wherein the module configured to define is further configured to disaggregate the first initial value to stored characteristic value combinations related to the plurality of component types of the configurable product to obtain the second initial values for the plurality of component types.

16. The computerized system of claim 15, wherein the module configured to define is further configured to determine a difference between the first initial value and the sum of the second initial values for the component types.

17. The method of claim 7, wherein generating comprises generating the modified demand plan for the plurality of configurable products of the product family based on at least the initial demand plan and the additional characteristic value.

18. The method of claim 7, further comprising:
receiving modified transactional data, the modified transactional data modifying at least one of (i) the total planned number of configurable products in the product family and (ii) the planned number of products to be produced for the products in the product family,
wherein generating comprises generating the modified demand plan for the plurality of configurable products of the product family based on at least the modified transactional data and the additional characteristic value, the modified demand plan preserving a proportional relationship between the number of the products of the product family to be produced.

19. The method of claim 1, wherein the defining further comprises inputting transactional data defining the first initial value and the plurality of second initial values.

20. The method of claim 1, wherein further comprising specifying the at least one product dependent characteristic for which the additional characteristic value is calculated.

21. The apparatus of claim 13, wherein the processor is further configured to specify the at least one product dependent characteristic for which the additional characteristic value is calculated.

22. The computerized system of claim 14, further comprising a module configured to input transactional data defining the first initial value and the plurality of second initial values.

23. The computerized system of claim 14, further comprising a module configured to specify the at least one product dependent characteristic for which the additional characteristic value is calculated.

24. A tangible machine readable storage device storing a set of instructions that, when executed on a processor, perform a method for planning demand in a managed supply chain, the method comprising:
storing master data defining a set of characteristic value combinations relating to product-dependent characteristics of a configurable product, wherein the configurable product is associated with a plurality of component types;

defining an initial demand plan for the configurable product, the initial demand plan comprising a first initial value and a plurality of second initial values, wherein the first initial value defines a planned number of the configurable product, and further wherein the second initial values define planned numbers of the plurality of component types associated with the configurable product;

calculating an additional characteristic value for one or more of the product dependent characteristics of the configurable product based on the defined initial demand plan; and generating a modified demand plan for the at least one configurable product based on the defined initial demand plan and the calculated additional characteristic value, the modified demand plan preserving a proportional relationship between the planned number of the configurable product and a sum of the planned numbers of the plurality of component types associated with the configurable product, wherein generating the modified demand plan comprises:

modifying the planned number of the configurable product or at least one of the planned numbers of the plurality of component types of the configurable product according to the calculated additional characteristic value.

25. The apparatus of claim 13, further comprising:

a data storage system to store master data defining a set of characteristic value combinations relating to the product dependent characteristics of the configurable product; and a user interface for receiving input of transactional data defining the initial demand plan for the configurable product.

* * * * *